F. A. SCHULZ.
METAL SPINNING LATHE.
APPLICATION FILED JULY 29, 1910.
987,405.
Patented Mar. 21, 1911.
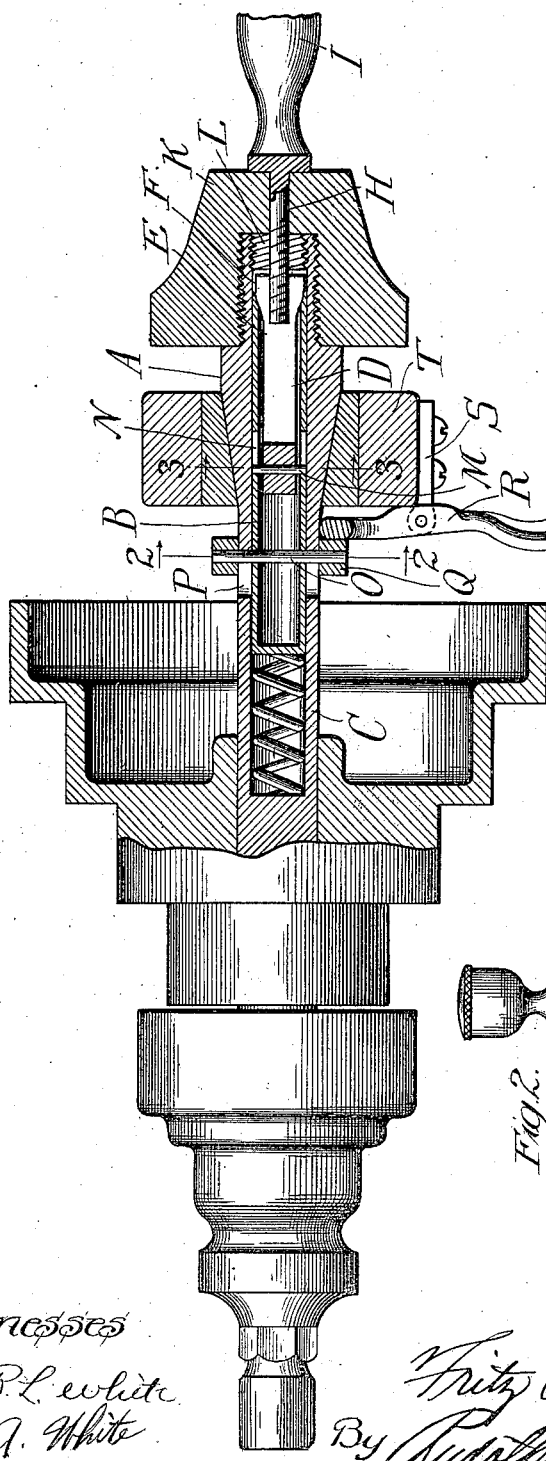
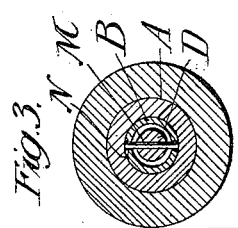
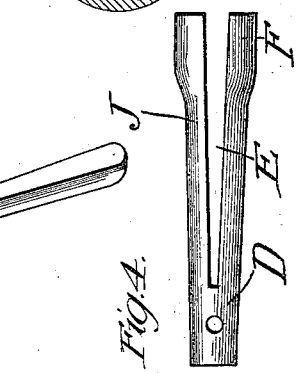
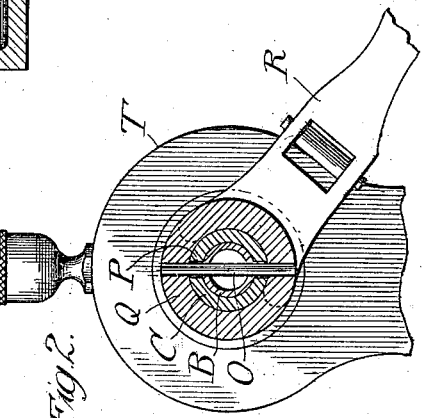

UNITED STATES PATENT OFFICE.

FRITZ A. SCHULZ, OF CHICAGO, ILLINOIS.

METAL-SPINNING LATHE.

987,405.  Specification of Letters Patent.  Patented Mar. 21, 1911.

Application filed July 29, 1910. Serial No. 574,555.

*To all whom it may concern:*

Be it known that I, FRITZ A. SCHULZ, a citizen of the United States, residing at Chicago, in the county of Cook and State of Illinois, have invented certain new and useful Improvements in Metal - Spinning Lathes; and I do hereby declare the following to be a full, clear, and exact description of the invention, such as will enable others skilled in the art to which it appertains to make and use the same.

This invention relates to a novel construction in a metal spinning lathe of the type used for doing what is known as center-punched spinning, and has for its object to provide means for enabling work to be quickly removed and replaced, thus effecting a great saving of time and labor, and consists in the features of construction and combinations of parts hereinafter fully described and claimed.

In the accompanying drawings illustrating this invention: Figure —1— is a view in central longitudinal section of a lathe spindle constructed in accordance with my invention, part of the lathe being shown in elevation. Fig. —2— is a transverse section on the line 2—2 of Fig. —1—. Fig. —3— is a detail transverse section on the line 3—3 of Fig. —1—. Fig. —4— is a view in side elevation of the split nut employed.

Metal spinning is at the present time done in two ways, one being by center-punching the blank and securing the same upon the chuck preparatory to spinning, this method being most commonly employed in the manufacture of small pieces forming parts of gas fixtures, and, in fact, is commonly employed wherever the center hole or perforation does not interfere with the use of the piece spun. The other method consists in securing the blank by clamping it in the lathe against one end of the chuck; this method being more commonly employed by the manufacture of parts of cooking utensils or other pieces which must present an unbroken imperforate surface.

In the manufacture of small spun metal pieces of the center-punched variety it is necessary each time that a piece is to be removed from the lathe and a new blank inserted to stop the lathe and reverse it to remove the threaded member by means of which the blank is held upon the chuck, then insert the new blank and start the lathe.

As the lathes travel at a high speed, the stopping and reversing thereof occupies a great deal of time and it is the object of my invention to provide means whereby the finished piece may be removed and the new blank inserted without stopping the lathe. To this end the lathe spindle A is rendered hollow throughout part of its length and in said hollow portion a sleeve B is reciprocally movable, the same being normally maintained at one end of its movement by means of the spring C. Said sleeve B is open at the end nearest the open end of the spindle A and in said end receives a split nut D. The latter consists of a single piece of metal slotted as at E almost its entire length, thus forming two jaws F which are relatively movable and which normally tend to separate. Each of the said jaws is provided in the face opposing the other with an almost semi-cylindrical threaded recess G in which the threaded stem H of the handle I is adapted to be received and engaged. When said jaws are moved toward each other as indicated in Fig. —3—, the said jaws F are of greater thickness than the shank portion of the split nut and between said jaws and shank portions is a tapered surface J which is adapted to be engaged by the forward end portion of the sleeve B to contract said nut.

The spindle A is externally threaded at its forward end to receive the chuck K over which the metal is adapted to be spun and is threaded internally to receive a plug L which is adapted to limit the forward movement of the split nut E and which also is provided with a smooth central opening through which the stem H is guided into engaging relation to said nut E. The latter is reciprocally movable in the sleeve E and is held against rotation relatively thereto by means of the pin M projecting at its ends into the longitudinal slots N in said sleeve B. The latter is in turn held against rotation relatively to the spindle A by means of the pin O which projects through the longitudinal slots P in said spindle A and at its free ends enters the radial openings in a collar Q mounted on said spindle. The said collar Q is engaged by the bifurcated end of the lever R pivotally secured to the plate S suitably mounted on the bearing T of the spindle A. The said spindle A rotates toward the operator and the threads externally of the spindle and those within the nut are right-hand threads so that any resistance offered to the rotation of the spindle, as by the pressure of the spinning tool on the metal, will tend to tighten the hold of the spindle thereon. The spindle rotates at relatively high speed as is well-known, and after each blank has been spun over the chuck K it must be removed before the next blank can be spun. To effect this the lever R is pressed forward thereby forcing the sleeve B back against the action of the spring C. This releases the inclined or tapered surface J of the split nut from engagement with the mouth portion of said sleeve B and causes the nut E to open thereby releasing the stem H of the handle I. The latter can now be withdrawn by the operator without stopping the lathe and at the same time the piece of metal spun over the chuck K can be likewise withdrawn from the latter. A new blank is then mounted upon the stem H and the latter inserted through the center hole in the chuck K and plug L and is immediately engaged by the nut E which is normally maintained contracted by the action of the spring C.

It will be obvious that considerable saving of time is effected by means of my device which is very simple and efficient. The saving in most instances amounts to 20% of the time otherwise required, thus effecting an increase of 25% in the production of the lathe.

I claim as my invention:

1. A chuck comprising a hollow spindle, a sleeve movable longitudinally within the same and having a flaring mouth, a member split at one end and enlarged to form separable jaws adapted to fit said flaring mouth of said sleeve and be forced together thereby, said sleeve being provided with a longitudinal slot, a pin in said split member entering said slot, a pin in said sleeve passing through a longitudinal slot in said spindle, a collar longitudinally movable on said spindle and receiving the ends of said pin in said sleeve, a spring for normally holding said sleeve at the forward limit of its movement, a stop disposed in the path of said split member, and a lever engaging said collar for moving said sleeve against the action of said spring.

2. A chuck comprising a hollow spindle, a sleeve movable longitudinally within the same and having a flaring mouth, a member split at one end and enlarged to form separable jaws adapted to fit said flaring mouth of said sleeve and be forced together thereby, said sleeve being provided with a longitudinal slot, a pin in said split member entering said slot, a pin in said sleeve passing through a longitudinal slot in said spindle, a collar longitudinally movable on said spindle and receiving the ends of said pin in said sleeve, a spring for normally holding said sleeve at the forward limit of its movement, a plug in the forward end of said spindle constituting a stop for said split member and having a smooth central opening adapted to guide an inserted threaded member into engaging relation to the threaded portion of the split member, and a lever engaging said collar for moving said sleeve against the action of said spring.

In testimony whereof I have signed my name in presence of two subscribing witnesses.

FRITZ A. SCHULZ.

Witnesses.
F. J. CORRIGAN,
RUDOLPH WM. LOTZ.

---

Copies of this patent may be obtained for five cents each, by addressing the "Commissioner of Patents Washington, D. C."